United States Patent Office 3,779,986
Patented Dec. 18, 1973

3,779,986
CURABLE COMPOSITIONS
Stanley D. Smith, Northfield, Ohio, and Stephen B. Hamilton, Schenectady, N.Y., assignors to General Electric Company
No Drawing. Continuation-in-part of application Ser. No. 104,488, Jan. 6, 1971, now Patent No. 3,689,454. This application Aug. 21, 1972, Ser. No. 282,337
The portion of the term of the patent subsequent to Sept. 5, 1989, has been disclaimed and dedicated to the Public
Int. Cl. C08f 11/04
U.S. Cl. 260—46.5 G         20 Claims

ABSTRACT OF THE DISCLOSURE

Fluid organopolysiloxanes which are vulcanizable at room temperature to silicone elastomers are prepared by mixing a novel titanium catalyst such as the propanedioxy bis(ethylacetoacetonate) complex of titanium, a cross-linking agent such as methyltrimethoxysilane and a silanol chain-stopped polydiorganosiloxane fluid having a viscosity of 1,000 to about 10,000 centipoises at 25° C. in the absence of moisture. These compositions are stable, free-flowing fluids in the absence of moisture but cure to the rubbery solid elastic state upon exposure to moisture. The compositions are particularly useful as adhesives and sealants in the construction of electronic equipment in that they do not give off corrosive by-products when curing.

BACKGROUND OF THE INVENTION

This application is a continuation-in-part of present application of Hamilton et al., Ser. No. 104,488, filed Jan. 6, 1971 now Pat. No. 3,689,454.

This invention pertains to fluid organopolysiloxanes which are capable of vulcanizing at room temperature to rubbery materials, to the cross-linking, chain extending and chain terminating agents used in such compositions, and to a novel catalyst system for curing such compositions.

The prior art room temperature vulcanizing materials (RTV's) comprise a linear polymer and a cross linking agent. The prior art RTV's which have had commercial success have either given off corrosive by-products during cure, have required the mixing of two ingredients immediately prior to cure, or have suffered the disadvantage of extreme thickening during the initial mixing of the ingredients followed by a viscosity decrease only upon prolonged standing. A disadvantage of the prior art RTV's which gave off corrosive by-products is that when they were used in construction of electronic circuitry the corrosive by-products damaged the thin copper wires used in the electronic circuits, and any other of the electronic components which were corrodable. A disadvantage of the RTV's which had to be mixed immediately prior to cure is that such a procedure is inconvenient and any of the RTV which is not used, cures to a rubbery state and is unusable. A disadvantage of the RTV's which thicken immediately upon mixing the ingredients is that it is difficult to handle the material in its thickened state, thus making the mixing, transferring and packaging steps more burdensome.

SUMMARY OF THE INVENTION

The RTV's of the present invention comprise a silanol chain-stopped polydiorganosiloxane having a viscosity of preferably 1,000 to 90,000 centipoises at 25° C. and generally 1,000 to 10,000,000 centipoises at 25° C., at least one silane represented by the formula:

(1)  $R_mSi(OR^1)_{4-m}$ and at least one titanium chelate catalyst of the formula:

(2)

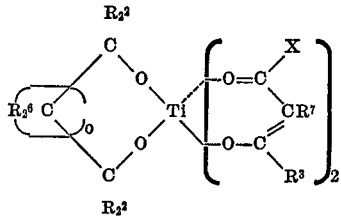

wherein R is a radical having not more than about 8 carbon atoms selected from the group consisting of hydrocarbyl, halohydrocarbyl, and cyano lower alkyl, $R^1$ is a radical not having not more than about 8 carbon atoms selected from the group consisting of hydrocarbyl, halohydrocarbyl and cyano lower alkyl, $R^2$ is a radical selected from the group consisting of hydrogen, hydrocarbyl having not more than about 8 carbon atoms, carboxylalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^6$ can be selected from the same group as $R^2$ and in addition can be halo, cyano, nitro, carboxy ester, acyl and hydrocarbyl substituted by halo, cyano, nitro, carboxy ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ can form together with the carbon atoms to which they are attached cyclic hydrocarbon substituents of not more than about 12 carbon atoms and chloro, nitro, acyl, cyano and carboxy ester substituted cyclic hydrocarbon substituents; X is a radical selected from the class consisting of radicals having up to 20 carbon atoms selected from the group consisting of hydrocarbyl, halohydrocarbyl, cyanoalkyl, alkoxy, haloalkoxy, cyanoalkoxy and amino and polyether groups of the formula $-(C_qH_{2q}O)_vR$ where $q$ varies from 2 to 4 and $v$ varies from 1 to 20, $m$ has a value of 0 to 3 and an average value based upon the total amount of silane in the composition of 0 to 1.99, $o$ has a value of 0 to 8, and such that when $o$ is zero the

moieties are bonded to each other in a cyclic fashion.

The term hydrocarbyl as used here means the hydrocarbon from which one hydrogen atom has been removed, i.e., a monovalent hydrocarbon radical.

The abbreviation of RTV as used herein means a room temperature vulcanizable material.

In the construction and fabrication of electronic components the mixing immediately prior to using requirements, the corrosion problems and the thickening and thinning with time problems associated with the prior art RTV's no longer exist. The RTV's of the present invention do not require mixing immediately prior to use, are stable indefinitely, do not thicken appreciably upon mixing the ingredients, and do not result in corrosion when used in electronic circuits.

DESCRIPTION OF THE PREFERRED EMBODIMENTS

In the formula of the cross-linking agent used in the practice of the present invention (1)  $R_mSi(OR^1)_{4-m}$ R and $R^1$ can be, for example, mononuclear aryl, such as phenyl, benzyl, tolyl, xylyl and ethylphenyl; halogen-substituted mononuclear aryl, such as 2,6-di-chlorophenyl, 4-bromophenyl, 2,5-di-fluorophenyl, 2,4,6-trichlorophenyl and 2,5 - dibromophenyl; alkyl such as methyl, ethyl, n-propyl, isopropyl, n-butyl, sec-butyl, isobutyl, tert-butyl, amyl, hexyl, heptyl, octyl; alkenyl such as vinyl, allyl, n-butenyl-1, n-butenyl-2, n-pentenyl-2, n-hexenyl-2, 2,3-dimethylbutenyl-2, n-heptenyl; alknyl such as propargyl, 2-butynyl; haloalkyl such as chloromethyl, iodomethyl, bromomethyl, fluoromethyl, chloroethyl, iodoethyl, bromoethyl, fluoroethyl, trichloromethyl, di-iodoethyl, tribromomethyl, trifluoromethyl, dichloroethyl, chloro-n-propyl, bromo-n-propyl, iodoisopropyl, bromo-n-butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 1,4-dichlorohexyl, 1,3-dibromohexyl, bromooctyl; haloalkenyl such as chlorovinyl, bromovinyl, chloroallyl, bromoallyl, 3-chloro-n-butenyl-1, 3-chloro-n-pentenyl-1, 3-fluoro-n-heptenyl-1, 1,3,3-trichloro-n-heptenyl-5, 1,3,5-tri-chloro-n-octenyl-6, 2,3,3-trichloromethylpentenyl-4; haloalkynyl such as chloropropargyl, bromopropargyl; cycloalkyl, cycloalkenyl and alkyl and halogen substituted cycloalkyl and cycloalkenyl such as cyclopentyl, cyclohexyl, cycloheptyl, cyclooctyl, 6-methylcyclohexyl, 3,4-dichlorocyclohexyl, 2,6-dibromocycloheptyl, 1-cyclopentenyl, 3-methyl-1-cyclopentenyl, 3,4-dimethyl-1-cyclopentenyl, 5-methyl-5-cyclopentenyl, 3,4-dichloro-5-cyclopentenyl, 5-(tert-butyl)-1-cyclopentenyl, 1-cyclohexenyl, 3-methyl-1-cyclohexenyl, 3,4-dimethyl-1-cyclohexenyl; and cyano lower alkyl such as cyanomethyl, beta-cyanoethyl, gamma-cyanopropyl, delta-cyanobutyl, and gamma-cyanoisobutyl.

In the formula of the catalyst and in the practice of the present invention

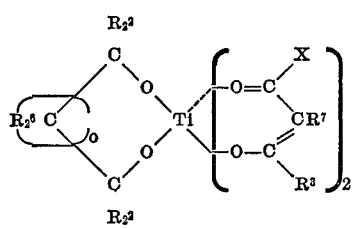

$R^2$ can be hydrocarbyl and halohydrocarbyl such as those listed above for R or hydrogen. In addition, $R^2$ can be a carboxy alkyl of the formula $R^8CO_2$— where $R^8$ is selected from the same group as R and can be joined to the $CO_2$ group either through the carbonyl carbon or an oxygen atom of the carboxyl group, $R^3$ can be hydrocarbyl, halohydrocarbyl and cyano alkyl such as those listed above for R, $R^6$ is a radical having not more than about 8 carbon atoms and can be selected from the same group as $R^2$ and in addition can be halo, cyano, nitro, carboxy ester, acyl and substituted hydrocarbyl containing halo, cyano, nitro, carboxy ester and acyl, the substituted hydrocarbyl can be derived from those listed above for R and the hydrocarbyl portion of the carboxy ester and the acyl can also be selected from the hydrocarbyl listed above for R, $R^7$ is selected from the group consisting of hydrogen, hydrocarbyl having not more than about 8 carbon atoms selected from the group set forth in the definition of R, halohydrocarbyl having not more than about 8 carbon atoms selected from the group set forth in the definition of R, acyl having not more than about 8 carbon atoms, the hydrocarbyl portion of which is selected from the group set forth in the definition of R. In addition, $R^7$ when taken together with $R^3$ can form together with the carbon atoms to which they are attached cyclohydrocarbon substituents of not more than about 12 carbon atoms and chloro, nitro, acyl, cyano and carboxy ester substituted cyclohydrocarbon substituents, the hydrocarbyl portion of the carboxy ester and acyl can be selected from the hydrocarbyl listed above for R, X can be hydrocarbyl, halohydrocarbyl, cyanoalkyl such as those listed above for R but having up to 20 carbon atoms on an ether moiety or polyether moiety. In addition, X can be a radical having up to 20 carbon atoms selected from the group consisting of alkoxy, haloalkoxy, and cyanoalkoxy and amine. The groups represented by X can be radicals of up to 20 carbon atoms such as methoxy, ethoxy, butoxy, propoxy, pentoxy, heptoxy; haloalkoxy such as chloromethoxy, iodomethoxy, bromoethoxy, fluoromethoxy, chloroethoxy, iodoethoxy, bromoethoxy, fluoroethoxy, trichloromethoxy, diiodoethoxy, dibromomethoxy, trifluoromethoxy, dichloroethoxy, chloro-n-propoxy, bromo-n-propoxy, iodoisopropoxy, bromo-n-butoxy, bromo-tert-butoxy, 1,3,3-trichlorobutoxy, 1,3,3-tribromobutoxy, chloropentoxy, bromopentoxy, 2,3-dichloropentoxy, 3-3-dibromopentoxy, chlorohexoxy, bromohexoxy, 2,4-dichlorohexoxy, 1,3-dibromohexoxy, 1,3,4-trichlorohexoxy, chlorohexoxy, chloroheptoxy, bromoheptoxy, fluoroheptoxy, 1,3-dichloroheptoxy, 1,4,4-trichloroheptoxy, 2,4-dichloromethylheptoxy, chlorooctoxy, bromooctoxy, iodooctoxy, 2,4-dichloromethylhexoxy, 2,4-dichlorooctoxy, 2,4,4-trichloromethylpentoxy, 1,3,5-tribromooctoxy; the cyanoalkoxy can be cyanomethoxy, beta-cyanoethoxy, gamma-cyanopropoxy, delta-cyanobutoxy, gamma-cyanoisobutoxy, beta-cyanopropoxy and alpha-cyanobutoxy; the hydrocarbyl portions of the amino can be selected from the group defined by R and the amino can be, for example, diethylamino, methylamino, diisopropylamino, octylamino, and ethylbutylamino. In addition, as explained previously, X can be an ether or polyether moiety of the formula —$(C_qH_{2q}O)_vR$, where R is as previously defined, $q$ varies from 2 to 4 and $v$ varies from 1 to 20.

The silanol chain-stopped polydiorganosiloxanes useful in the RTV compositions of this invention can be represented by the formula, (3) 

wherein $R^4$ and $R^5$ are each organic radicals of up to 20 carbon atoms selected from the group consisting of hydrocarbyl, halohydrocarbyl and cyano lower alkyl, and $n$ is a number that varies generally from about 300 to about 5,200 or more preferably from 370 to 1,350.

The silanol chain-stopped polydiorganosiloxanes are well known in the art and include compositions containing different $R^4$ and $R^5$ groups. For example, the $R^4$ groups can be methyl, while the $R^5$ groups can be phenyl and/or beta-cyanoethyl. Furthermore, within the scope of the definition of polydiorganosiloxanes useful in this invention are copolymers of various types of diorganosiloxane units, such as silanol chain-stopped copolymers of dimethylsiloxane units, diphenylsiloxane units and methylphenylsiloxane units or, for example, copolymers of dimethylsiloxane units, methylphenylsiloxane units and methylvinylsiloxane units. Preferably, at least 50% of the $R^4$ and $R^5$ groups of the silanol chain-stopped polydiorganosiloxanes are methyl groups.

In Formula 3, the hydrocarbyl, halohydrocarbyl and cyano lower alkyl radicals represented by $R^4$ and $R^5$ can be selected from the same group as those listed above for R and $R^1$.

A mixture of various silanol chain-stopped polydiorganosiloxanes also may be employed. The silanol chain-stopped material useful in the RTV compositions of this invention have been described as polydiorganosiloxanes but such materials can also contain minor amounts, e.g., up to about 20% of monoorganosiloxane units such as monoalkylsiloxane units, e.g., monomethylsiloxane units and monophenylsiloxane units. The technology involved in incorporating monoalkylsiloxane units into RTV compositions is disclosed in U.S. Pat. 3,382,205 of Beers (1968), which is hereby incorporated into the present application by reference. The silanol chain-stopped materials may also contain triorganosiloxane units, such as trialkylsiloxane units, e.g., trimethylsiloxane units, tributylsiloxane units and triphenylsiloxane units. The silanol chain-stopped material may also contain t-alkoxysiloxane units, e.g., t-butoxysiloxane units, t-pentoxysiloxane units, and t-amyloxysiloxane units. Effective results can be obtained if sufficient t-alkoxysiloxane is utilized in combination with the silanol-terminated polydiorganosiloxane of Formula 3 to provide a polymer having a ratio of t-alkoxysiloxane units to silanol of 0.05 to 0.9 and preferably 0.2 to 0.8 tert-alkoxydialkylsiloxy units per silanol. Many of the t-alkoxysiloxanes useful as part of the silanol chain-stopped materials are described and claimed in U.S. Pat. 3,438,930 of Beers, which issued Apr. 15, 1969 and is assigned to the General Electric Company, the disclosure of which is expressedly incorporated herein by reference.

The silanol chain-stopped polydiorganosiloxanes employed in the particle of the present invention may vary from low viscosity thin fluids to viscous gums, depending upon the value of $n$ and the nature of the particular organic groups represented by $R^4$ and $R^5$.

Examples of silanes of Formula 1 useful in the RTV compositions of this invention include the following:

$$CH_3Si(OCH_3)_3$$

$$CH_3Si(OCH_2CH_3)_3$$

$$(CH_3)_2Si(OCH_3)_2$$

$$(CH_3)_3SiOCH_3$$

$$Si(OCH_3)_4$$

$$CH_3CH_2CH_2CH_2CH_2CH_2CH_2CH_2Si(OCH_3)_3$$

$$CF_3CH_2Si(OCH_3)_3$$

$$NCCH_2CH_2Si(OCH_3)_3$$

$$(CH_3)Si(OCH_2CH_2CH_2CH_3)_3$$

Examples of titanium chelate catalysts of Formula 2 useful in the RTV compositions of this invention include the following:

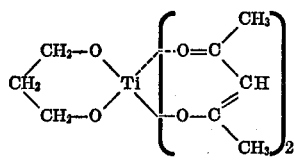
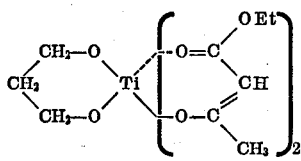
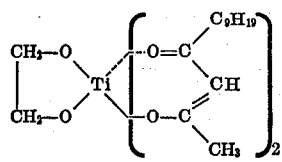
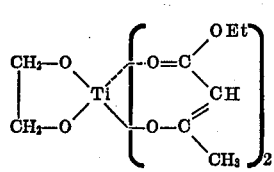

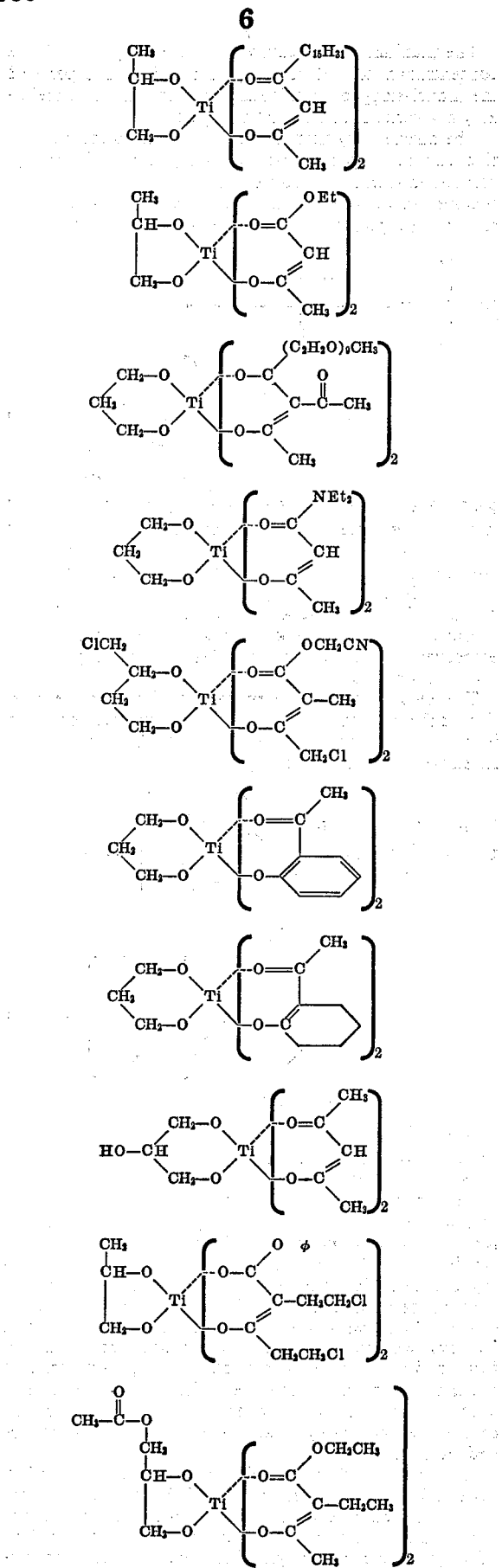

Other examples are readily apparent from the description of the substituents which may be present on the titanium.

The titanium chelate catalysts are presently utilized at a concentration of 0.01 to 10 parts based on 100 parts of the silanol-stopped polysiloxane of Formula 3 and preferably at a concentration of 0.5 to 1 part.

The alkanedioxy titanium chelates of the present invention can be prepared first by adding a beta-dicarbonyl compound such as a beta-diketone or a beta-ketoester to a titanium ortho ester of a lower aliphatic alcohol. This reaction is represented by the following equation:

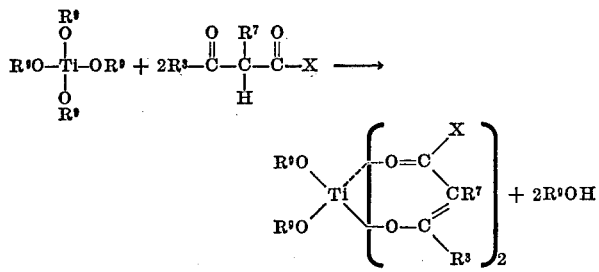

Preferably, two moles of the beta-dicarbonyl compound are used per mole of titanium compound. Toluene is the preferred solvent, preferably in the amount of from 0.5 part to 10 parts per part of alkyl titanate. In the above formula, $R^9$ is a lower alkyl radical having 1 to 8 carbon atoms and $R^3$, $R^7$ and X are as previously defined. It is preferred that stoichiometric quantities of reactants be employed as this avoids the problem of removing unreactive starting material.

The second step of the preparation involves the reaction of the dialkoxy titanium chelate preparation of which is described above with an alkanediol. This reaction is illustrated by the following equation:

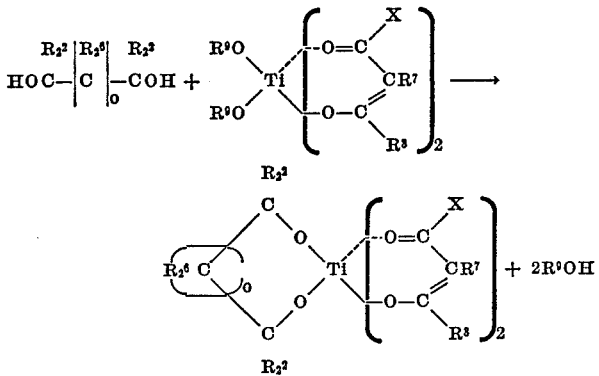

In the above formulas, $R^2$ and $R^6$ are as previously defined. Again, it is preferred that the quantities of reactants be stoichiometric. If an excess of the alkanediol is employed only one of the hydroxyl groups of some of the diol will react with the titanium by alkoxy inttrchange to form hydroxyalkoxy-substituted titanates. In addition to the desired product, the alkoxy exchange reaction employing the diol also can lead to the formation of minor amounts of polymeric materials where one hydroxy of the diol will react with one titanium chelate and the second hydroxy will react with the second titanium chelate to form a dimer. Trimer and tetramer formation can also occur in this manner. The use of large quantities of solvent such as from two to twenty parts of toluene per part of the chelated dialkyl titanates tends to diminish trimer and tetramer formation.

It is preferred that when the dicarbonyl compound is a lower alkyl ester of acetoacetic acid that the temperature be maintained below 70° C. The preferred dicarbonyl compound is a lower alkyl ester of acetoacetic acid. The alkyl group can be straight chain or branched. The preferred group of acetoacetates include methylacetoacetate, ethylacetoacetate, propylacetoacetate, isobutylacetoacetate, pentylacetoacetate, hexylacetoacetate, heptylacetoacetate, and octylacetoacetate. The preferred acetoacetate is ethyl acetoacetate. It is also preferred that $R^9$ be an isopropyl radical as this via alkoxy interchange produces isopropyl alcohol. The isopropyl alcohol can then be azeotroped off using toluene as the azeotroping agent in both of the above-described reactions.

The use of a solvent is not necessary but is preferred. Solvents other than toluene which can be employed include benzene, xylene, hexane or any other of the well known solvents useful for the azeotropic removal of formed alcohol from solution.

The RTV compositions of the present invention are prepared by simply admixing one or more of the silanes of Formula 1, having an average of at least about 2.01 silicon-bonded alkoxy radicals per silicon atom and the titanium chelate of Formula 2 with the silanol chain-stopped polyliorganosiloxane of Formula 3. The components are preferably at room temperature during mixing. Since the silanes tend to hydrolyze upon contact with moisture, care should be exercised to exclude moisture during the addition of the silane to the silanol chain-stopped polydiorganosiloxane. Likewise, care should be taken that the mixture of the silane, the titanium chelate and the silanol chain-stopped polydiorganosiloxane is maintained under substantially anhydrous conditions if it is desired to store the admixture for an extended period of time prior to conversion of the composition to the cured, solid, elastic silicone rubber state. On the other hand, if it is desired to permit the mixture to cure immediately upon admixture of the silane, the titanium chelate and the polydiorganosiloxane, no special precautions are necessary and the three components can be mixed and placed in the form or shape in which it is desired for the composition to be cured.

The amount of the silane of Formula 1 admixed with the silanol chain-stopped polydiorganosiloxane of Formula 3 can vary within wide limits. However, for best results, it is preferred to add an excess of one mole of the silane per mole of silanol groups in the silanol chain-stopped polydiorganosiloxanes. Satisfactory curing can be obtained, for example, with from 1.0 to 10 moles of the silane per mole of silanol groups in the polydiorganosiloxane. No particular detriment is suffered from using more than 10 moles of the silane per mole of the polydiorganosiloxane except for a more resinous product being formed and slowing down the cure. The temperature at which the silane and the silanol chain-stopped polydiorganosiloxane are admixed is not critical and a room temperature addition is usually employed.

The admixture can be carried out in the presence of an inert solvent (that is, a solvent which will not react with the silanol or alkoxy groups on the silicon). Suitable solvents include hydrocarbon such as benzene, toluene, xylene, or petroleum ethers; halogenated solvents such as perchloroethylene or chlorobenzene and organic ethers such as diethylether and dibutylether; ketones such as methylisobutylketone and fluid hydroxyl-free polysiloxanes. The presence of a solvent is particularly advantageous when the silanol chain-stopped polydiorganosiloxane is a high molecular weight gum. The solvent reduces the overall viscosity of the composition and facilitates cure. The RTV compositions may be kept in the solvent until they are to be used. This is particularly valuable when a gummy composition is to be employed in coating applications.

The RTV compositions of this invention are stable in the absence of moisture. Consequently, they can be stored for prolonged periods of time without deleterious effect. During this period of storage no significant change occurs in the physical properties of the RTV compositions. This is of particular importance from a commercial standpoint, since it assures that once an RTV composition is prepared with a certain consistency and cure time that neither will change significantly upon storage.

Storage stability is one of the characteristics which makes the compositions of this invention particularly valuable as a one component room temperature vulcanizing composition.

A wide choice of components is available in the preparation of the RTV compositions of the present invention. In general, the particular components employed are a function of the properties desired in the cured silicone rubber. Thus, with a particular silane, some variation in the properties of the cured silicone rubber are obtained by varying the molecular weight (as measured by viscosity) of the silanol chain-stopped polydiorganosiloxane of Formula 3. For a given system, as the viscosity of the silanol chain-stopped starting material increases, the elongation of the cured rubber increases. On the other hand, with a lower viscosity material, the cure is tighter so that the cured rubber has a lower elongation and increased hardness.

RTV compositions prepared by mixing the novel titanium catalyst and the silane with the silanol chain-stopped polydiorganosiloxanes can be used without further modification in many sealing, caulking or coating applications by merely placing the compositions in the desired place and permitting them to cure upon exposure to the moisture present in the atmosphere. Upon exposure of such compositions to atmospheric moisture, even after storage for times as long as two years or more, a "skin" will form on the compositions shortly after exposure and cure to the rubbery state will occur within one to three days, all at room temperature. The time required for the formation of such skin can vary from a minimum of about one hour to a maximum of about eight hours.

It is often desirable to modify the RTV compositions of the present invention by the addition of various materials which act as extenders or which change various properties such as cure rate and color. For example, if it is desired to reduce the time required for complete cure, the composition can be modified by the incorporation of a minor amount of carboxylic acid salt, alkoxide and/or chelate of a metal ranging from lead to manganese, inclusive, in the electromotive series of metals. The particular metals included are lead, tin, nickel, cobalt, iron, cadmium, chromium, zinc and manganese. The carboxylic acids from which the salts of these metals are derived can be monocarboxylic acids or dicarboxylic acids and the metallic salts can be either soluble or insoluble in the silanol chain-stopped polydiorganosiloxane. Preferably, the salts employed are soluble in the silanol chain-stopped polydiorganosiloxane since this facilitates the uniform dispersion of the salt in the reaction mixture.

Illustrative of metal salts which can be employed are, for example, zinc naphthenate, lead naphthenate, cobalt naphthenate, iron 2-ethylhexoate, cobalt octoate, zinc octoate, lead octoate, chromium octoate, and tin octoate. Operative metal salts include those in which the metallic ion contains a hydrocarbon substituent such as, for example, carbomethoxyphenyl tin trisuberate, isobutyl tin triceroate, cyclohexenyl lead triactotinate, xenyl lead trisalicylate, dimethyl tin dibutyrate, basic dimethyl tin oleate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin diacetate, dicyclopentyl lead bis-monochloroacetate, dibenzyl lead di-2-pentanoate, diallyl lead di-2-hexenoate, triethyl tin tartrate, tributyl tin acetate, tri-phenyl tin acetate, tricyclohexyl tin acrylate, tri-tolyl tin terephthalate, tri-n-propyl lead acetate, tri-stearyl lead succinate, tri-naphthyl lead p-methylbenzoate, tris-phenyl lead cyclohexenyl acetate, triphenyl lead ethylmalonate, etc.

The amount of the metal salt of the organic carboxylic acid which can be employed is a function of the increased rate of curing desired so that any amount of such salt up to the maximum effective amount for increasing the cure rate can be employed. In general, no particular benefit is derived from employing more than about 5% by weight of such metal salt based on the weight of the silanol chain-stopped polydiorganosiloxane. Preferably, where such metal salt is employed, it is present in an amount equal to from about 0.01% to 2.0% by weight, based on the weight of the polydiorganosiloxane of Formula 3.

The alkoxides which can be used in the practice of the present invention include di-butyl tin dimethoxide, dimethyl tin diethoxide, dibutyl tin dibutoxide, tin tetraisopropoxide, tin tetramethoxide, and tri-butyl tin methoxide.

The RTV compositions of the present invention can also be varied by the incorporation of various extenders or fillers. Illustrative of the many fillers which can be employed with the compositions of the present invention are titanium dioxide, lithopone, zinc oxide, zirconium silicate, silica aerogel, iron oxide, diatomaceous earth, calcium carbonate, fumed silica, silazane treated silica, precipitated silica, octamethylcyclotetrasiloxane treated silica, glass fibers, magnesium oxide, chromic oxide, zirconium oxide, aluminum oxide, crushed quartz, calcined clay, asbestos, carbon, graphite, cork, cotton, synthetic fibers, etc. Silazane treated silica fillers such as those disclosed and claimed in application Ser. No. 789,352 of Smith filed Jan. 6, 1969, now Pat. No. 3,635,743, are particularly suitable for use in the RTV compositions of the present invention, they are generally employed in amounts from about 5 to about 200 parts filler, per 100 parts of silanol chain-stopped polydiorganosiloxane.

In addition to the modification of the RTV compositions of the present invention by addition of metal salt, cure accelerators and fillers, these compositions can also be modified by the incorporation of various flame retardants, stabilizing agents and plasticizers such as siloxane fluids. Suitable flame retardants include antimony oxide, various polyhalogenated hydrocarbons and organic sulfonates.

Where the compositions of the present invention contain components other than the silane, the titanium chelate catalyst and the polydiorganosiloxane, the various ingredients can be added in any desired order. However, for ease of manufacturing, it is often convenient to form a blend or mixture of all of the components of the room temperature vulcanizing organopolysiloxane except the silane and the titanium chelate catalyst, to then remove moisture from the resulting mixture by maintaining the mixture under vacuum and thereafter to add the silane and the titanium chelate catalyst prior to packaging of the composition in containers protected from moisture.

The RTV compositions of the present invention are particularly adapted for caulking and sealing applications where adhesion to various surfaces is important. For example, these materials are useful in household caulking applications and industrial applications such as on buildings, factories, automotive equipment and in applications where adhesion to masonry, glass, plastic, metal and wood is required.

The silanes represented by Formula 1 are well known in the art and are described, for example, in U.S. Pat. 2,843,555 of Berridge.

When the silane is employed as a cross-linking agent, $m$ has a value of 1 and the preferred silane is $$CH_3Si(OCH_3)_3$$

When it is desired to have a chain extending agent employed in combination with the cross-linking agent, $m$ has a value of 2 resulting in the silane being difunctional. The preferred difunctional silane is 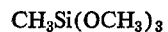. The presence of a chain extending agent results in a final cured product having a higher degree of elasticity. The same result would be obtained if a higher molecular weight silanol-stopped fluid were used, however, the use of such a higher molecular weight silanol-stopped fluid would result in a much higher viscosity of the curable composition resulting in difficulties in handling the extremely viscous material.

When it is desired to improve the modulus of elasticity, a silane of Formula 1, wherein $m$ has a value of 3, is incorporated into the RTV composition. The preferred silane for this application is $(CH_3)_3SiOCH_3$. The use of this monofunctional silane chain terminating unit in combination with the cross-linking and optionally chain extending silanes discussed above, not only results in a higher modulus of elasticity but in many instances also improves the adhesion of the cured compositions to a substrate.

The preferred silanol chain-stopped polydiorganosiloxanes of Formula 3 to be used in combination with the silane cross-linking agent described above are silanol chain-stopped polydiorganosiloxanes having a viscosity in the range of about 1,000 centipoises to 10,000,000 centipoises at 25° C. The preferred polydiorganosiloxanes are polydimethylsiloxanes having from about 370 to about 1,350 dimethylsiloxy units per molecule and can contain some trimethylsiloxy groups. The presence of tertiary alkoxy groups such as t-butoxy groups also improves the adhesion of the RTV's of the present invention to particular substrates.

Generally speaking, in the preferred embodiment of the present invention, R is an alkyl radical of not more than 4 carbon atoms, $R^1$ is an alkyl radical of not more than 4 carbon atoms, $R^2$ is hydrogen, $R^3$ is an alkyl radical of not more than 4 carbon atoms, at least 50% of the groups represented by $R^4$ and $R^5$ are methyl radicals, the remainder phenyl; and $n$ is a number from 10 to 15,000.

The preferred silanes of Formula 1 used in the RTV compositions described in the present invention contain on the average of from 1.05 to 3 silicon-bonded alkoxy groups per silane when a fluid containing two silanol-containing terminal groups is employed. If the number of alkoxy groups were to be two this would merely result in a build-up of chain length. Average in this situation means the total number of silicon-bonded alkoxy groups divided by the total number of silane molecules used in the RTV composition.

The preferred RTV compositions of the present invention also include fillers. The most preferred of which is the silazone treated silica filler disclosed and claimed in application Ser. No. 789,352 of Smith, filed Jan. 6, 1969. The fillers are preferably used in amounts from about 10 to about 100 parts of filler, per 100 parts of the silanol chain-stopped polydiorganosiloxane.

The silazane treated filler can be prepared by the following procedure. A fumed silica filler is contacted with ammonia for about 1½ hours at 25° C. with agitation. Hexamethyldisilazane is added to the treated filler in an amount of about 20 parts per 100 parts of treated filler and the mixture is heated to about 130° C. for about 2 hours. Water in an amount of about one part by weight is added to the mixture and heating is continued at 130° C. for an additional hour. The treated silica filler is then purged with $N_2$ at 130° C. until the $NH_3$ content is 50 p.p.m.

Example 1

Ethylacetoacetate (268 parts) is added to 294 parts of tetraisopropyltitanate with stirring over a period of 2 hours. Stirring of this slightly exothermic reaction for an additional 2 hours is followed by removal of the formed isopropyl alcohol by distillation. A rapid addition of 78.5 parts of 1,3-propanediol to the resulting diisopropyltitanium bis(ethylacetoacetate) is carried out, and then this reaction mixture is allowed to stir at ambient temperature for 3 hours. Next a slow distillation is carried out using temperatures of 61 to 68° C., a heated Vigreaux column and a slight vacuum to remove the formed isopropyl alcohol and to shift the equilibrium in favor of the desired product. Toward the end of the distillation, 80 parts of anhydrous benzene is added to azeotrope off residual amounts of isopropyl alcohol and finally high vacuum stripping is employed. The resulting product (388 parts) is a yellowish, orange non-transparent viscous liquid at room temperature and a non-viscous liquid at 67° C. Infrared and nuclear magnetic resonance spectra is consistent with the proposed structure. The product is found to have a molecular weight of 437, the elemental analysis showed carbon 47.6%, hydrogen, 6.6%, and titanium 12.4% as opposed to a theoretical carbon of 47.4%, hydrogen 6.3% and titanium 12.60%. The product has the formula

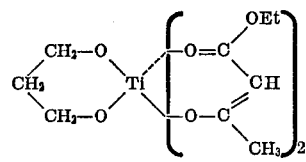

One hundred parts by weight of a mixture containing 100 parts of a 10,000 centipoise hydroxy end-blocked dimethylpolysiloxane fluid, 15 parts of trimethylsiloxane terminated polydimethylsiloxane fluid and 20 parts of octamethylcyclotetrasiloxane treated fumed silica is mixed with 5.1 parts of methyltrimethoxysilane, 0.93 part of 1,3-propanedioxytitanium bis(ethylacetoacetate) of the formula shown above, and 1.0 part of acetonitrile. The resulting RTV composition has a constant tack free time of 3½ hours and shows no change in viscosity or cure rate with aging. Cured sheets of this RTV composition are found to have a tensile of 380 p.s.i., an elongation of 350% and a durometer of 27. Extensive studies of the above RTV composition and of similar RTV compositions containing 1,3-propanedioxytitanium bis(ethylacetoacetate) have disclosed that such systems cause absolutely no corrosion to brass.

Example 2

The 1,3-propanedioxytitanium bis(acetylacetonate) is prepared by the following procedure. To 350 parts of tetraisopropyltitanate is added 246 parts of acetylacetone with stirring over a period of two hours. Stirring of this slightly exothermic reaction mixture for 16 hours at ambient temperatures is followed by removal of the formed isopropyl alcohol by distillation under reduced pressure. A rapid addition of 94 parts of 1,3-propanediol is carried out, and then the mixture is stirred at 68–87° C. for two hours. A slow distillation is carried out using a slight vacuum, a heated Vigreaux column and temperatures of 75–84° C. to remove the formed isopropyl alcohol and to shift the eqilibrium in favor of the desired product. Finally, a high vacuum stripping is employed to remove residual amounts of isopropyl alcohol and excess reactants. A nearly quantitative yield of the dark reddish, viscous product (382 parts) is obtained. Infrared and nuclear magnetic resonance spectra of the product are consistent with the proposed structure and vapor phase osmometry measurements disclosed that the product had a molecular weight of 410.

One hundred parts by weight of a 10,000 centipoise hydroxyl end-blocked polydimethylsiloxane fluid is mixed with 15 parts of trimethylsiloxane end-blocked polydimethylsiloxane fluid as a plasticizer, and 20 parts of octamethylcyclotetrasiloxane treated finely divided fumed silica. 100 parts of this base is then mixed with 4.2 parts of methyltrimethoxysilane, 1.0 part of the 1,3-propanedioxytitanium bis(acetylacetonate) dissolved in 1.6 parts of acetonitrile. The resulting RTV composition has a fairly constant tack free time of 2 hours, has a good through cure after several days of exposure to atmospheric moisture and shows no change in cure rate or viscosity after accelerated aging at 50° C. for one month. Cured sheets of the above-described RTV composition are found to have a tensile strength of 300 p.s.i., an elongation of 400% and a durometer of 27. In addition, the above material is found to have an unprimed peel adhesion of 21 lbs./in. from alclad aluminum with 80% adhesive failure. This RTV system is found to cause slight corrosion to brass when tested in accordance with conventional military specifications.

Examples 3 and 4

A series of comparative studies in which four different RTV compositions, differing only in the titanium chelate catalyst, has been carried out. A base mixture, which consisted of 100 parts of 10,000 centipoises hydroxy end-blocked dimethylpolysiloxane fluid, 15 parts of trimethylsiloxy terminated polydimethylsiloxane fluid and 20 parts of octamethylcyclotetrasiloxane fumed silica is used for each RTV composition. The RTV compositions in each case are comprised of 100 parts of the above-described base compound, 4 parts of methyltrimethoxysilane, 1.02 parts of acetonitrile and 1.74 mmole per 100 grams of base compound of one of the following titanium chelates: 1,3-propanedioxytitanium bis(ethylacetoacetate) (I), diisopropoxytitanium bis(ethylacetoacetate) (II), 1,3-propanedioxytitanium bis(acetylacetonate) (III) and diisopropoxytitanium bis(acetylacetonate) (IV). The factors determined for each RTV composition are cure rate, application rate and viscosity all as a function of time from immediately after catalyzation up to four weeks. Also, the physical properties of cured sheets are measured for each RTV composition. The findings of this comparative study are summarized in Tables I and II, whereby the properties of the different RTV compositions are shown.

When a hydroxy terminated polysiloxane, methyltrimethoxysilane and a dialkoxytitanium chelate or an alkanedioxytitanium chelate are mixed to form an RTV composition, the mixture increases in viscosity to reach a maximum and then decreases in viscosity (increases in application rate) with time until a "final state" is reached. Of the RTV systems studied, this very undesirable effect of structuring during and after catalyzation is found to be significantly smaller with the 1,3-propanedioxytitanium chelates (I, III). Also, the rate at which the RTV composition passed through this structured state or maximum viscosity is much greater with the alkanedioxytitanium chelates (I and III). The viscosities immediately after catalyzation and after the RTV has reached a "final state" are less with the 1,3-propanedioxytitanium chelates (I, III) than the corresponding viscosities of the RTV systems with the diisopropoxytitanium chelates (II, IV). An additional significant difference is seen in a comparison of the tensile strengths of elastomers prepared using the 1,3-propanedioxy chelates (I, III) and the isopropoxytitanium chelates (II, IV). The materials prepared according to the teachings of the present invention have tensile strengths approximately double those comparatively tested. In addition, as shown in Table I, the application rates of RTV's made using chelates I and III are many times greater than chelates II and IV. This increase in application rate is of considerable practical significance since it represents the maximum rate at which the RTV can be applied from a conventional container under standard conditions.

TABLE I

| Titanium chelate | | Application rate a (grams/min.) after time of— | | | | | Viscosity b (1×10⁶ cps.) after time of— | | | | |
|---|---|---|---|---|---|---|---|---|---|---|---|
| | | 0 hrs. | 24 hrs. | 48 hrs. | 1 wk. | 4 wks. | 0 hrs. | 24 hrs. | 48 hrs. | 1 wk. | 4 wks. |
| 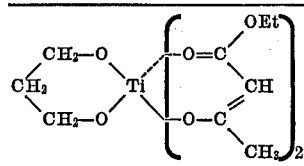 | (I) | 84.0 | 203 | 205 | 200 | 221 | 8.3 | 0.61 | 0.56 | 0.60 | 0.55 |
| 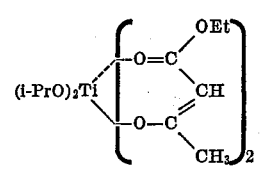 | (II) | 1.4 | 19.2 | 21.7 | 33.7 | 37.9 | 32 | 9.5 | 6.3 | 3.4 | 3.6 |
| 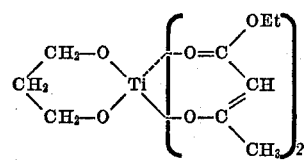 | (III) | 10.3 | 120 | 135 | 135 | 138 | 23 | 3.2 | 1.7 | 1.8 | 1.7 |
| 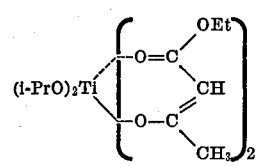 | (IV) | 3.3 | 2.8 | 6.3 | 18.6 | 42.1 | 31 | 29 | 22 | 9.9 | 4.5 | a The application rates were determined using a ⅛ inch orifice and 90 lbs. of inert gas pressure.
b A Brookfield HDF Viscometer and No. 7 spindle were used for all viscosity measurements.

TABLE III

| Titanium chelate | | Physical properties (of cured sheets) | | | Cure rate, tack free time after 1 wk. aging (hrs.) |
|---|---|---|---|---|---|
| | | Tensile (lbs./in.²) | Elongation (percent at break) | Durometer (Shore A) | |
| (structure) | (I) | 427 | 440 | 29 | 1 |
| (structure) | (II) | 258 | 420 | 25 | 3½ |
| (structure) | (III) | 424 | 480 | 29 | 2½ |
| (structure) | (IV) | 188 | 384 | 30 | 1½ |

The diisopropoxytitanium bis(ethylacetoacetate) of Formula II and the diisopropoxytitanium bis(acetoacetate) of Formula IV are known compositions of matter. The 1,3-propanedioxytitanium bis(ethylacetoacetate) is prepared by the procedure set forth in Example 1.

The 1,3-propanedioxytitanium bis(acetoacetate) of Formula III was prepared by the procedure described in Example 2.

Example 5

A compound of the formula

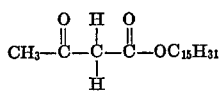

(655 parts) is added to 294 parts of tetraisopropyltitanate with stirring over a period of 2 hours. Stirring of this slightly exothermic reaction for an additional 2 hours is followed by removal of the formed isopropyl alcohol by distillation. A rapid addition of 78.5 parts of 1,3-propanediol to the resulting titanium compound is carried out, and then this reaction mixture is allowed to stir at ambient temperature for 3 hours. Next a slow distillation is carried out using temperatures of 61 to 72° C., a heated Vigreaux column and a slight vacuum to remove the formed isopropyl alcohol and to shift the equilibrium in favor of the desired product. Toward the end of the distillation, 80 parts of anhydrous benzene is added to azeotrope off residual amounts of isopropyl alcohol and finally high vacuum stripping is employed. The resulting product (931 parts) was a yellowish, orange non-transparent viscous liquid at room temperature and a non-viscous liquid at 67° C. Infrared and nuclear magnetic resonance spectra are consistent with the proposed structure. The product has the formula

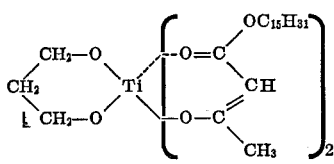

One hundred parts by weight of a mixture, containing 100 parts of a 10,000 centipoise hydroxy end-blocked dimethylpolysiloxane fluid, 15 parts of trimethylsiloxane terminated polydimethylsiloxane fluid and 20 parts of octamethylcyclotetrasiloxane treated fumed silica was mixed with 5.1 parts of methyltrimethoxysilane, 1.0 part of the above titanium compound of the formula shown above, and 1.0 part of acetonitrile. The resulting RTV composition has a constant tack free time of 3½ hours and shows no change in viscosity or cure rate with aging. Cured sheets of this RTV composition are found to have a tensile of 390 p.s.i., an elongation of 370% and a durometer of 29. Extensive studies of the above RTV composition and of similar RTV compositions containing the above titanium compound discloses that such systems cause absolutely no corrosion to brass or copper.

Example 6

To 350 parts of tetraisopropyltitanate there is added 1205 parts of a compound of the formula,

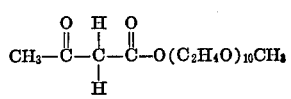

with stirring over a period of two hours. Stirring of this slightly exothermic reaction mixture for 16 hours at ambient temperatures is followed by removal of the formed isopropyl alcohol by distillation under reduced pressure. A rapid addition of 94 parts of 1,3-propanediol is carried out, and then the mixture is stirred at 68–87° C. for two hours. A slow distillation was carried out using a slight vacuum, a heated Vigreaux column and temperatures of 75–84° C. to remove the formed isopropyl alcohol and to shift the equilibrium in favor of the desired product. Finally, a high vacuum stripping is employed to remove residual amounts of isopropyl alcohol and excess reactants. A nearly quantitative yield of the dark reddish, viscous product (1871.8 parts) is obtained. Infrared and nuclear magnetic resonance spectra of the product are consistent with the following structure,

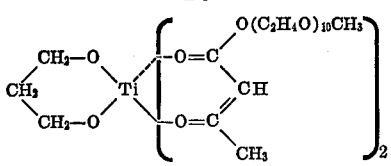

One hundred parts by weight of a 10,000 centipoise hydroxyl end-blocked polydimethylsiloxane fluid is mixed with 15 parts of trimethylsiloxane end-blocked polydimethylsiloxane fluid as a plasticizer, and 20 parts of octamethylcyclotetrasiloxane treated finely divided fumed silica. 100 parts of this base is then mixed with 4.2 parts of methyltrimethoxysilane, 1.1 parts of the above titanium chelate compound dissolved in 1.6 parts of acetonitrile. The resulting RTV composition has a fairly constant tack free time of 2 hours, has a good through cure after several days of exposure to atmospheric moisture and shows no change in cure rate or viscosity after accelerated aging at 50° C. for one month. Cured sheets of the above-described RTV composition are found to have a tensile strength of 300 p.s.i., an elongation of 400% and a durometer of 27. In addition, the above material is found to have an unprimed peel adhesion of 21 lbs./in. from alclad aluminum with 80% adhesive failure. This RTV system is found to cause no corrosion whatsoever to brass when tested in accordance with conventional military specifications.

We claim:

1. A fluid composition stable under substantially anhydrous conditions and curable to an elastic solid in the presence of moisture which comprises a silanol chain-stopped polydiorganosiloxane, represented by the formula,

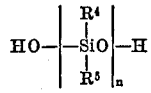

wherein $R^4$ and $R^5$ are a radical having not more than about 8 carbon atoms selected from the class consisting of hydrocarbyl, halohydrocarbyl and cyano lower alkyl wherein the radicals $R^4$ and $R^5$ may be different from each other and $n$ varies from about 300 to about 5,260, a silane represented by the formula:

$$R_mSi(OR^1)_{4-m}$$

and a titanium chelate catalyst of the formula:

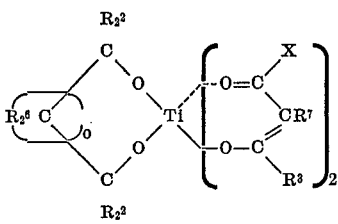

wherein R is a radical having not more than about 8 carbon atoms selected from the group consisting of hydrocarbyl, halohydrocarbyl, and cyano lower alkyl, $R^1$ is a radical having not more than about 8 carbon atoms selected from the group consisting of hydrocarbyl, halohydrocarbyl, and cyano lower alkyl, $R^2$ is a radical selected from the group consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^6$ is selected from the same group as $R^2$ halo, cyano, nitro, carboxy ester, acyl and hydrocarbyl substituted by halo, cyano, nitro, carboxy ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ forms together with the carbon atoms to which they are attached cyclichydrocarbon substituents of not more than about 12 carbon atoms and chloro, nitro, acyl, cyano and carboxy ester substituted cyclichydrocarbon substituents; X is a radical selected from the class consisting of radicals having up to 20 carbon atoms selected from the group consisting of hydrocarbyl, halohydrocarbyl, cyanoalkyl, alkoxy, haloalkoxy, cyanoalkoxy and amino and ether and polyether moieties of the formula $$—(C_qH_{2q}O)_vR$$

where $q$ varies from 2 to 4 and $v$ varies from 1 to 20 and R is as previously defined, $m$ has a value of 0 to 3 and an average value based upon the total amount of silane in the composition of 0 to 1.99, $o$ has a value of 0 to 8, and such that when $o$ is zero the

moieties are bonded to each other in a cyclic fashion.

2. The composition of claim 1 further characterized by at least 50% of the total number of $R^4$ and $R^5$ groups being methyl radicals.

3. The composition of claim 2 further characterized by the remaining $R^4$ and $R^5$ groups being phenyl radicals.

4. The composition of claim 1 further characterized by R, $R^1$ and $R^3$ being alkyl radicals and $R^2$ and $R^6$ being hydrogen.

5. The composition of claim 1 further characterized by R, $R^1$ and $R^3$ being methyl radicals, X being $$—OC_{15}H_{31}$$

and $o$ having a value of 1.

6. The composition of claim 5 further characterized by $R^2$ and $R^6$ being H.

7. The composition of claim 1 further characterized by R, $R^1$, $R^3$ and X being methyl radicals and $R^2$ and $R^6$ being H.

8. The composition of claim 1 further characterized by the mixture consisting of $$CH_3Si—(OCH_3)_3$$

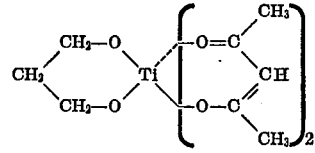

and

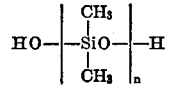

where $n$ is a number from about 300 to about 5,260.

9. The composition of claim 1 further characterized by the mixture consisting of

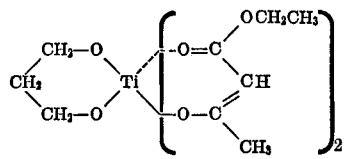

and

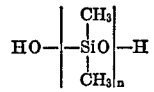

wherein $n$ is a number from about 370 to about 1,350.

10. The composition of claim 1 further characterized by $o$ being 0 or 1 and $R^2$ being hydrogen or methyl.

11. A method of forming a fluid composition stable under substantially anhydrous conditions and curable to an elastic solid in the presence of moisture which comprises mixing in the substantial absence of moisture a silanol chain-stopped polydiorganosiloxane, represented by the formula,

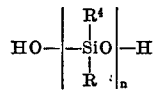

wherein $R^4$ and $R^5$ are a radical having not more than about 8 carbon atoms selected from the class consisting of hydrocarbyl, halohydrocarbyl and cyano lower alkyl wherein the radicals $R^4$ and $R^5$ may be different from each other and $n$ varies from about 300 to about 5,260, a silane represented by the formula:

$$R_mSi(OR^1)_{4-m}$$

and a titanium chelate catalyst of the formula:

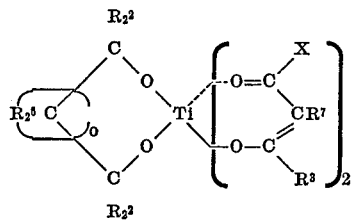

wherein R is a radical having not more than about 8 carbon atoms selected from the group consisting of hydrocarbyl, halohydrocarbyl, and cyano lower alkyl, $R^1$ is a radical having not more than about 8 carbon atoms selected from the group consisting of hydrocarbyl, halohydrocarbyl and cyano lower alkyl, $R^2$ is a radical selected from the group consisting of hydrogen, hydrocarbyl having not more than about 8 carbon atoms, carboxyalkyl and halohydrocarbyl having not more than about 8 carbon atoms and the total number of carbon atoms in the $R^2$ and $R^6$ substituted alkanedioxy radical is not more than about 18, $R^3$ is a radical having not more than about 8 carbon atoms selected from the group consisting of hydrocarbyl, halohydrocarbyl and cyano lower alkyl, $R^6$ is selected from the same group as $R^2$, halo, cyano, nitro, carboxy ester, acyl and hydrocarbyl substituted by halo, cyano, nitro, carboxy ester and acyl, $R^7$ is selected from the group consisting of hydrogen, hydrocarbyl having not more than about 8 carbon atoms, halohydrocarbyl having not more than about 8 carbon atoms, acyl having not more than about 8 carbon atoms, and taken together with $R^3$ forms together with the carbon atoms to which they are attached cyclichydrocarbon substituents of not more than about 12 carbon atoms and chloro, nitro, acyl, cyano and carboxy ester substituted cyclichydrocarbon substituents; X is a radical selected from the class containing of radicals having up to 20 carbon atoms selected from the group consisting of hydrocarbyl, halohydrocarbyl, cyanoalkyl, alkoxy, haloalkoxy, cyanoalkoxy and amino and ether and polyether moieties of the formula $—(C_qH_{2q}O)_vR$, where R is as previously defined, $q$ varies from 2 to 4 and $v$ varies from 1 to 20, $m$ has a value of 0 to 3 and an average value based upon the total amount of silane in the composition of 0 to 1.99, $o$ has a value of 0 to 8, and such that when $o$ is zero the

moieties are bonded to each other in a cyclic fashion.

12. The method of claim 11 further characterized by at least 50% of the total number of $R^4$ and $R^5$ groups being methyl radicals.

13. The method of claim 12 further characterized by the remaining $R^4$ and $R^5$ groups being phenyl radicals.

14. The method of claim 11 further characterized by R, $R^1$ and $R^3$ being alkyl radicals and $R^2$ and $R^6$ being hydrogen.

15. The method of claim 11 further characterized by R, $R^1$ and $R^3$ being methyl radicals, X being $—OC_2H_5$, and $o$ having a value of zero or 1.

16. The method of claim 15 further characterized by $R^2$ and $R^6$ being H.

17. The method of claim 11 further characterized by R, R1, $R^3$ and X being methyl radicals and $R^2$ and $R^6$ being H.

18. The method of claim 11 further characterized by the mixture consisting of $$CH_3Si(OCH_3)_3$$

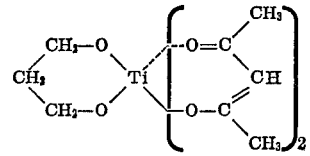

and

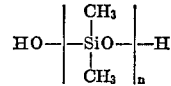

where $n$ is a number from about 300 to about 5,260.

19. The method of claim 11 further characterized by the mixture consisting of $$CH_3Si(OCH_3)_3$$

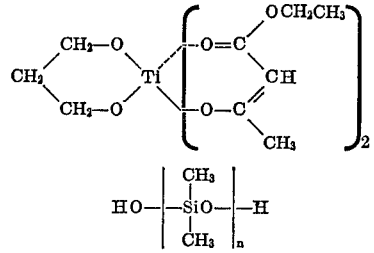

and

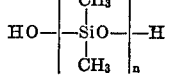

where $n$ is a number from about 370 to about 1,350.

20. The method of claim 11 further characterized by $o$ being 0 or 1 and $R^2$ being hydrogen or methyl.

References Cited
UNITED STATES PATENTS

| | | | |
|---|---|---|---|
| 3,689,454 | 9/1972 | Smith et al. | 260—46.5 G |
| 3,334,067 | 8/1967 | Weyenberg | 260—46.5 G |
| 3,499,859 | 3/1970 | Matherly | 260—46.5 G |

DONALD E. CZAJA, Primary Examiner

M. I. MARQUIS, Assistant Examiner

U.S. Cl. X.R.

117—123 D, 135.1, 138.8 R, 143 R; 260—18 S, 32.8 SB, 32.2 SB, 33.8 SB, 37 SB, 45.7 S, 45.75 R, 46.5 E, 825